Aug. 1, 1967 R. MARLOT 3,334,185

SIGNAL TRANSMISSION SYSTEMS BY CARRIER CURRENTS ON A POWER LINE

Filed Aug. 15, 1963 2 Sheets-Sheet 1

United States Patent Office 3,334,185

Patented Aug. 1, 1967

3,334,185

SIGNAL TRANSMISSION SYSTEMS BY CARRIER CURRENTS ON A POWER LINE

Raoul Marlot, Saint-Jean-de-Luz, France, assignor to Electricite de France (Service National), Paris, France, a society of France Filed Aug. 15, 1963, Ser. No. 302,268
Claims priority, application France, Aug. 23, 1962, 907,625
5 Claims. (Cl. 179—2.5)

The present invention relates to systems for transmitting signals by means of carrier currents on a power line and it is more especially concerned with systems for transmitting protection, control and/or intelligence signals on high voltage power lines. It includes, as main new features, a peak limiter and a base limiter, this last unit following a detector and preceding a pulse elongator and a duration limiter.

The chief object of the present invention is to increase both safety of transmission against various disturbances and rapidity of this transmission while simplifying the circuits brought into play.

A main feature of the present invention consists, on the one hand, in providing in shunt at each end of each power line a transmission system comprising—in addition to the usual coupling capacitor, drainage coil, tuned circuits, matching transformers, coaxial cable and detector—at least one peak clipper or peak limiter adjusted to operate at a voltage which, while being much higher than that of the received signals, permits of preventing, or at least of severely limiting in duration, the excitation of oscillations in the tuned circuits ahead of which it is mounted in response to steep leading edge disturbances, a base clipper or base limiter connected to the output of the detector and working at a level much lower than that of the received signals, a signal elongator or stretcher connected to the output of the low level limiter and followed by a saturated amplifier, the elongator-amplifier system having for its effects to lengthen the pulses it receives from the base limiter, and a duration limiter or time standard unit connected at the output of the saturated amplifier and shortening the pulses that are received by a constant duration greater than the maximum duration of the pulses corresponding to oscillations produced by shock-excitation in the tuned circuits, and, on the other hand, in using for transmission an unmodulated high frequency current with a high power and in coding e.g. pulse coding, this current by means of a coding device and also in reducing the time constant of the tuned circuits.

According to another preferred, but not necessary, feature of the invention, on the one hand, in order to avoid crosstalk between several power lines connected to the same high voltage station provided with a signal transmisison device making use of carrier currents over a single frequency and, on the other hand, to prevent bus bar sets from creating oscillatory disturbances at a frequency close to that of the transmission, every set of bus bars of the station is grounded through a capacitor and a coil in series, this series arrangement being such that, for the frequency of the signals, the set of bus bars is short-circuited toward the ground.

A further, preferred but not necessary, feature of the invention consists, in a station to which several lines are connected, in providing for the whole of the station, on the one hand for transmisison, a single signal transmitter working on a single high frequency and cooperating with a single coding device, and means for directing the coded high frequency toward the power line through which the transmission is to be made and, on the other hand for reception, a single decoder-selector system for decoding the coded signals received by the different lines of the station and selecting the various relays to be controlled.

Preferred embodiments of the present invention will be hereinafter described with reference to the appended drawings, given merely by way of example, and in which.

Figures 1, 9:
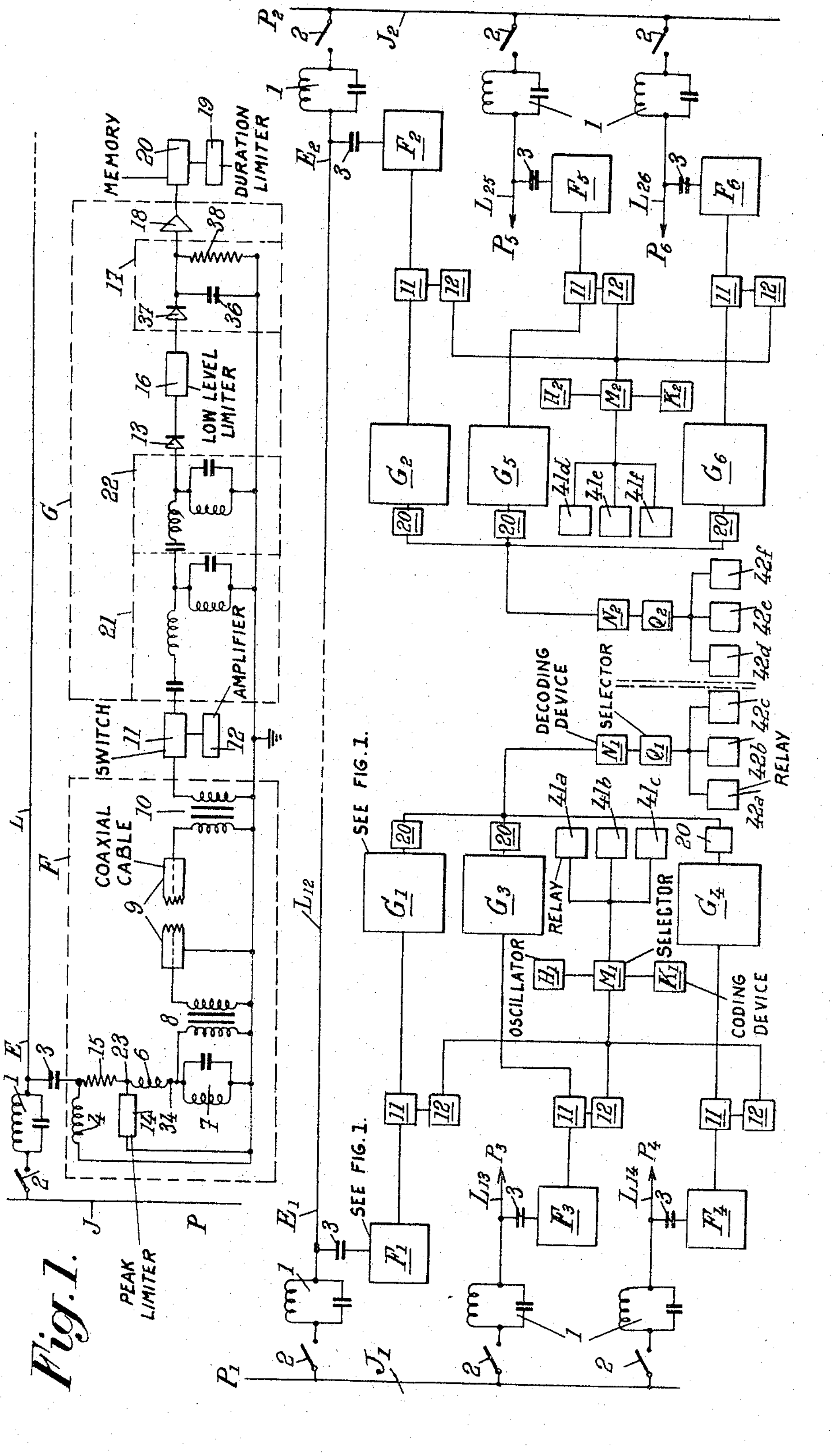
FIG. 1 illustrates a preferred embodiment of a circuit according to the present invention disposed at the end of a power line in a high voltage station.
FIG. 9 is a general diagrammatic view of a system for transmitting signals by means of carrier currents made according to the invention.

Before giving a detailed description of an embodiment of the invention the nature and character of the chief disturbances or interferences occurring in signal transmission systems by means of carrier currents on power lines will be stated.

The first type of interferences consists of the disturbances created by the operation of the circuit breakers and of the disconnecting switches. These disturbances consist of damped wave trains preceded by a very steep first leading edge. The frequency of these waves generally ranges from 100 kc./s. to several mc./s. and the amplitude may reach 20 kv., but their power is very low. The frequency of repetition of the wave trains ranges from about 100 c./s. to several kc./s. As for the total duration of a disturbance produced by the operation of a circuit breaker or of a disconnecting switch, it averages some seconds. It may therefore completely eliminate a useful signal in the known signal transmission systems making use of carrier currents, even when use is made of voltage limiters mounted in a conventional manner, because these limiters more or less short-circuit the signal at the same time as the simultaneous disturbance, whereby the signal is lost.

Another type of disturbances consists of those resulting from defects in the line. These are particularly noxious for transmitting signals when they are of the character of a pulse, that is to say have a steep leading edge. Conventional limiters have for their effect to considerably reduce the amplitude of the disturbances transmitted to the signal receiving circuits and consequently the shock-excited oscillations in the tuned circuits of the receiver. If the power of the disturbances of this type is generally greater than that of the disturbances created by the operation of the circuit breakers and disconnecting switches, their duration is much shorter and they are therefore less disturbing for the transmission of signals.

Finally it will be noted that some line defects (icing, grounding, etc.) have for their effect to increase, sometimes very considerably, the absorption factor of the line, and therefore the weakening of the transmission.

The above considerations will permit a better understanding of the improvements according to the invention, which will be described now first with reference to FIG. 1. First, according to prior art, each end E of a power line L is connected to a set of bus bars J of a station P through a stopper or anti-resonant circuit 1 at a frequency *f* of the signals (in such manner as to prevent said signals from reaching the set of bus bars) and a switching of element (circuit breaker or disconnecting switch) 2 (full stop).

Secondly, also according to the prior art, there are provided, at each end E of the transmission system and in shunt relatively to line L, a coupling or blocking capacitor 3, a drainage coil 4 (which constitutes a 50 c./s. short circuit, the whole of capacitor 3 and coil 4 serving to stop the 50 c./s. industrial current while permitting passage of the signals and also of the disturbances), a circuit 3–6 tuned to the frequency of the signal, a first matching transformer 8 (the primary impedance of which is equal to the characteristic impedance of the line), a coaxial cable 9 (serving to transmit without substantial deformation signals from the vicinity of the end E of line L, where elements 3, 4 and 6 are located, to the receiver station which is at some distance from E), a second matching transformer 10 followed by switch 11 selectively connecting to the secondary of transformer 10 the amplifier 12 of the transmitter or the receiver proper, and a detector 13. Thirdly, according to the new features of the invention, there are provided, at each end E of the transmission system, at least one peak limiter 14, as usual (particular examples of which are described hereinafter with reference to FIGS. 2 to 5), adjusted to operate at a voltage which, while being much higher than that of the received signals, permits of preventing, or at least of severely limiting in duration, the excitation of oscillations in the tuned circuits separated from line L by said limiter, in response to disturbances with steep leading edge (an auxiliary resistance 15 having for its effect to reduce the intensity of the current flowing through the peak limiter), a base limiter 16 connected to the output of detector 13 and working at a level much lower than that of the signal received, a signal elongator or stretcher 17 connected to the output of the base limiter 16 and followed by a saturated amplifier 18, the assembly 17–18 having for its effect to lengthen or stretch the pulses it receives from base limiter 16 and a duration limiter or time standard unit 19 connected downstream (in the shunt circuit starting with capacitor 3) of the saturated amplifier and acting upon a primary memory 20 to shorten the pulses delivered by this amplifier by a constant duration greater than the maximum duration of the pulses corresponding to the shock-excited oscillations generated in tuned circuits 3–6–7 and filters 21–22.

At last, also according to the invention, use is made for transmission of an unmodulated high frequency current, of high power, said current being coded by means of a coding device, and the time constant of the different tuned circuits and filters is reduced. There is further advantageously provided a stopper or anti-resonant circuit 7 rejecting the frequency *f* of the signals toward the receiver.

The operation of the system illustrated by FIG. 1 concerns the reception of the useful signals arriving at E after having been transmitted from the other end (not shown) of line L (as hereinafter explained with reference to FIG. 9) in the form of pulse series constituted by unmodulated oscillations of high frequency (from some tens to some hundreds of kc./s. for instance) and the elimination of the various disturbances.

On the one hand, the 50 c./s. industrial current passes through anti-resonant circuit 1 and reaches the set of bus bars J or starts from this set of bus bars (it will be supposed that switch 2 is closed) without being able to reach resistor 15 due to the fact that coupling or blocking capacitor 3, of the order of some nanofarads, practically stops any current of industrial frequency, the residues at a frequency of 50 c./s. being short-circuited to the ground through drainage coil 4 in the known manner.

On the other hand, the high frequency signals and high frequency disturbances arriving to end E are rejected by anti-resonant circuit 1 and pass through capacitor 3 to reach resistor 15 (if it exists), drainage coil 4 having a very high impedance toward the ground (the different treatment of the 50 c./s. industrial current, on the one hand, and of the signals and disturbances at a frequency of several kc./s. or mc./s., on the other hand, by capacitor 3 and drainage coil 4 arises from the fact that the impedance of a capacitor decreases proportionally when the frequency increases, whereas that of a coil is proportional to the frequency, and that the ratio of the frequencies is of the order of 1 to 1000 or more).

Resistor 15 lowers the voltage of the signals and of the disturbances arriving at point 23. In the absence of important disturbances, as long as the voltage at 23 is lower, in absolute value, than the threshold S of peak limiter 14, this voltage is applied to coil 6, forming with coupling capacitor 3 a circuit tuned to the frequency of the signals, in order to reduce the transmisison of parasitic oscillations and disturbances toward the receiver proper and also to match the impedance of the receiver to the characteristic impedance of the line. An analogous part is played by anti-resonant circuit 7, which rejects the frequency of the signals toward transformer 8 but short-circuits toward the ground the parasitic oscillations and disturbances of frequencies sharply different from the frequency *f* chosen for the signals, the effects of tuned circuit 3–6 and of anti-resonant circuit 7 being added together.

On the contrary, for disturbances of high intensity, peak limiter 14 limits to a maximum value, determined by its set threshold, the absolute amplitude of the voltage applied to coil 6. This threshold is much higher than the maximum amplitude of the signals received, while making it possible considerably to reduce the amplitude of the disturbances and therefore to prevent them from generating oscillations by shocks of important amplitude in anti-resonant circuit 7. This threshold S may be of several kilovolts, for instance 4 kv., such a high value of the threshold having also the advantage of transforming the very harmful (biconically shaped) disturbances, resulting from operations on lines at very high voltage (above 200,000 volts), consisting of a succession of damped oscillations of important initial amplitude, into a succession of oscillations of lower maximum amplitude. However, with the improvements of FIGS. 8 and 10, it is possible to reduce the threshold to a much lower value (for instance about 100 volts). If this value is lower than the transmission voltage at point 23, the peak limiter is disconnected during transmission by an ultra-quick relay in series therewith.

Peak limiter 14 may be made of different structures. FIGS. 2 to 5 show four preferred embodiments thereof.

Figures 2, 3, 4, 5, 6, 7:
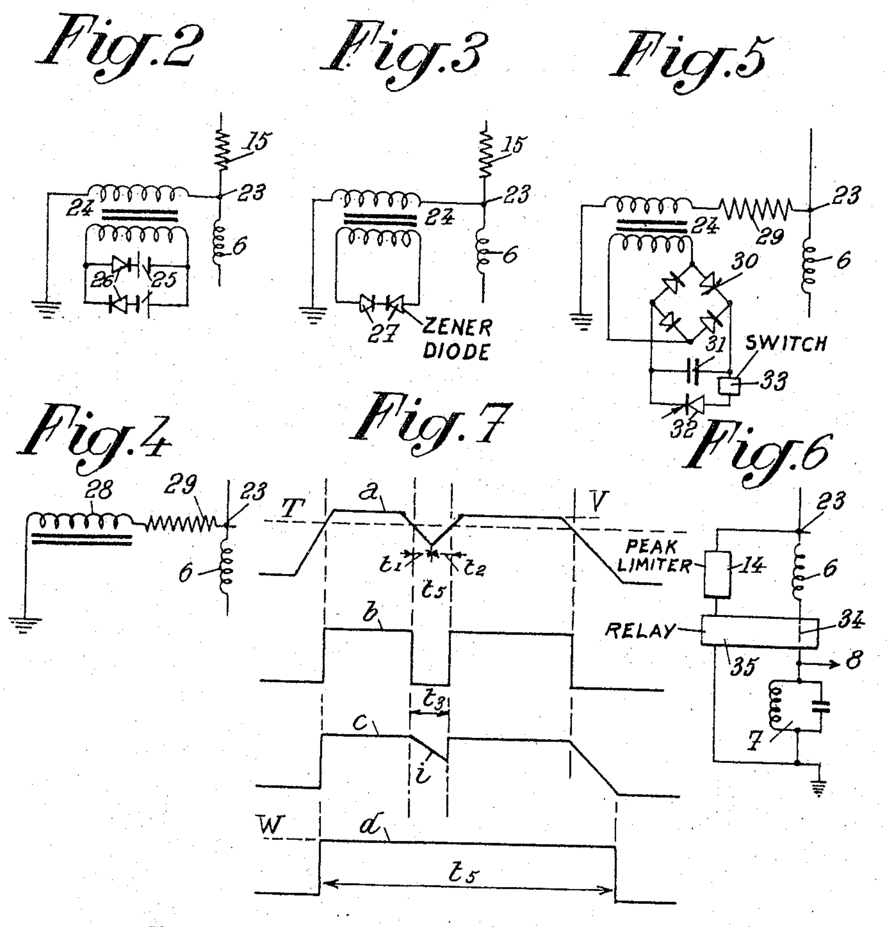
FIGS. 2, 3, 4 and 5 show four possible embodiments of the peak limiter of FIG. 1.
FIG. 6 shows a modification of a portion of FIG. 1, comprising an electronic relay cutting off the circuit of FIG. 1 under control of the peak limiter, in case of overvoltage.
FIG. 7(*a–d*) is a diagram, where the times are plotted in abscissas and the amplitudes in ordinates, for explaining the elimination of the oscillatory disturbances by the system comprising the base limiter, the elongator and the saturated amplifier.

In the embodiment of FIG. 2, the peak limiter comprises a transformer 24 the primary of which is connected between point 23, common to resistor 15 and coil 6, and the ground and the secondary of which is mounted in a circuit comprising in shunt two circuit elements mounted in opposition and including each a battery or primary cell 25 and a diode 26. The value of the threshold is given by the identical voltage difference of each of the batteries 25 divided by the transformation ratio of transformer 24. As a matter of fact, diodes 26 are normally reversely biased and do not transmit current. On the contrary, when the voltage induced in the secondary winding exceeds in absolute value the potential difference of batteries 25, one of the diodes is forwardly biased and is conductive of current. The secondary circuit which was previously open closes.

The peak limiter of FIG. 3 also comprises a transformer 24, but the voltage determining the threshold is obtained by means of two Zener diodes 27 mounted in opposition. Consequently as long as the Zener breakdown voltage is not reached by the current induced in the secondary of transformer 24, this secondary is in open circuit conditions. On the contrary, for sufficiently high values of the potential at 23, this potential induces in the secondary of transformer 24 a voltage sufficient to produce the operation of one of the diodes on its reverse characteristic, closing the secondary circuit through a small resistance (that of the two diodes in series).

In the embodiment of FIG. 4, which is the preferred embodiment, use is made to constitute peak limiter 14 of a saturable coil or inductance 28 connected in series with a resistor 29. Coil 28, which is not saturated for the voltage of the signals that are transmitted and received, becomes saturated for disturbance voltages. In such a device, there is not a true peak limiting threshold as in the case of embodiments of FIGS. 2 and 3, wherein one passes suddenly from a transformer on no load, below the threshold, to a short-circuited transformer above the threshold, but a gradual limitation, in a limited band, of the voltage. Resistor 29 serves to render a periodic the circuit and thus to prevent oscillations thereof. It is possible, with the peak limiter of FIG. 4, to do away (as illustrated) with resistor 15 because the resistor 29 of the peak limiter acts to reduce the voltage for coil 28.

Finally, FIG. 5 shows another type of peak limiter for use in the system of FIG. 1. This peak limiter comprises, in addition with a voltage reducing resistor 29 (which permits of doing away with resistor 15), a transformer 24 the primary of which is connected in the same manner as that of FIGS. 2 and 3 and the secondary of which serves to feed, through a rectifier bridge 30, the shunt connection of a capacitor 31 on the one hand and of the series arrangement of a semiconductor controlled rectifier (s.c.r.) 32, e.g., a PNPN silicon controlled rectifier and of an ultra-quick electronic switch 33 (capable of acting within some microseconds) on the other hand. The operation of this peak limiter is as follows. As long as the threshold voltage (set by the voltage applied to the control electrode by not shown means) has not been reached, the circuit of the secondary of transformer 24 is open because s.c.r. 32 is blocked. When a given threshold voltage across the terminals of capacitor 31 is reached, the s.c.r. gets into operation and becomes conductive. Transformer 24 works in short-circuited manner. Switch 33 is necessary due to the fact that s.c.r., once made conductive, will remain so even after a reduction of the voltage applied thereto. This switch opens the secondary circuit of the transformer after a time such that the voltage across the terminals of the s.c.r. has dropped to a low value, insufficient to permit a reignition of the s.c.r.

Whatever be the peak limiter 14 that is used, it is always possible, if so desired, considerably to increase its efficiency by causing it to control an electronic relay which cuts off the circuit downstream of coil 6, at point 34 (FIG. 1). Such an arrangement is illustrated by FIG. 6 which shows a modification of the left hand lower portion of the diagram of FIG. 1. FIG. 6 shows, as above stated, coil 6, peak limiter 14, points 23 and 34 and anti-resonant circuit 7, as in FIG. 1. In FIG. 6, I have diagrammatically shown an electronic relay 35 which opens the circuit at 34 every time current flows through peak limiter 14, that is to say for every disturbance the amplitude of which exceeds, in absolute value, the peak limiting threshold. Relay 35 is chosen to have a time of response very short with respect to the tuning period of the tuned circuits (period of the transmitted signals), for instance a time of response of the order of magnitude of one nanosecond. The cut off of the circuit at 34 during high amplitudes of disturbance currents prevents the voltage of the peak limiting threshold from reaching the circuits downstream of point 34 and consequently from producing substantial oscillations by shock-excitation in these circuits.

Reverting now to the description of the operation illustrated by FIG. 1 downstream of peak limiter 14, it will first be reminded that the function of coil 6 is to form with coupling condensor 3 a circuit tuned to the frequency $f$ of the signals reducing the coefficient of transmission of the disturbances without substantially weakening the transmission of the useful signals. Anti-resonant circuit 7, also tuned to this frequency $f$, rejects the signals toward transformer 8 while short-circuiting toward the ground a portion of the disturbances. However some disturbances, acted upon by peak limiter 14 and weakened by tuned circuits 3, 6, generate by shock excitation (by resonance of the tuned circuit to its own period), in circuit 7, oscillations which reach transformer 8.

Coaxial cable 9 and the two matching transformers 8 and 10 allow to locate in the desired spot, relatively to the set of bus bars J, the remainder of the equipment, in particular transmitter amplifier 12, receiver 13 and 16 to 22 and the switching member 11.

This switching member 11, which may consist in a known manner either of a differential transformer (with two primary windings and two secondary windings) and a resistor balancing circuit, or of an electronic switch, permits, when transmitting, of directing the signals from amplifier 12 toward the transformer 10 of the system F to be described in detail hereinafter and, thence, toward line L and, when receiving, of switching the signals (and also the disturbances) from line L toward filters 21, 22 and thence toward the detector 13 of the line receiver system G which will now be described in detail.

The line receiver first comprises identical pass-band filter cells 21, 22 tuned to the frequency $f$ of the signals so as to weaken as much as possible the disturbances that would reach them, without substantially weakening the useful signals. The filtered signals are rectified by detector 13 which supplies unidirectional current depending upon the useful signals, and therefore upon the information sent through line L (and also upon the disturbances). The unidirectional current passes through a base limiter 16, consisting for instance in the known manner of a transistor the emitter of which is biased at a fixed voltage, which eliminates the portion of the rectified current which does not exceed a given amplitude. The base limiter 16 is followed by an elongator 17 which comprises a storing capacitor 36 which is charged with the signal delivered by the base limiter through diode 37 (resistor 38 limiting the value of the charge), then discharges through amplifier 18 (diode 37 preventing a return of current) in the absence of the signal having passed through the base limiter, which lengthens the duration of a signal having thus passed through the base limiter. Finally direct current saturated amplifier 18 makes the output of elongator 17 smoother.

The operation and the function of units 16, 17 and 18 in case of oscillating disturbances having passed through filters 21, 22 can be explained with reference to the curve of FIG. 7, where as usually the times are plotted in abscissas and the amplitudes of the unidirectional voltages in ordinates.

If such a disturbance has taken place simultaneously with a useful signal pulse the level of which will be supposed to be very little higher than the limit level (the most unfavorable case), the weakening introduced by peak limiter 14 has damped the useful signal for the time $t_1$ of the disturbance. Therefore, at the output of base limiter 16, there will be a voltage of the form $a$ illustrated by FIG. 7, the amplitude of the signal being lower than the level T of operation of limiter 16 not only during time $t_1$ but also during time $t_2$ at the end of which it will return to its normal level V, $t_2$ depending upon the time constant of the system. Consequently, the voltage received at the output of the low level limiter 16 (curve $b$) will be interrupted during time $t_3$ which is equal to $t_1+t_2$, because the base limiter keeps only the portion of curve $a$ above level T.

The arrangement of elongator 17 and saturated amplifier 18 eliminates this interruption. As a matter of fact, by choosing for the elongator a time constant greater than $t_3$, capacitor 36 replaces the signal which does not exist during time $t_3$ by a discharge signal $i$ and therefore the voltage curve $c$ is obtained at the output of elongator 17. Finally, saturated amplifier 18 brings to the same level W both the signal that has been cut off and the discharge signal $i$ of capacitor 36 so that there is obtained, at the output of amplifier 18, a signal *d* having the same rectangular shape as in the absence of a disturbance.

Of course, care must be taken that a new disturbance does not appear in the detected signal *a* before the end of period $t_3$. Therefore the threshold S of the peak limiter will be chosen at a sufficiently high level for causing the amplitude of the disturbance of point 23 to be under this threshold S and for preventing a further disturbance from reaching this threshold before the end of $t_3$. For instance choice will be made of a threshold of several kilovolts in the case of a 380 kv. line where repeated "biconically-shaped" overvoltages occur.

Figure 8:
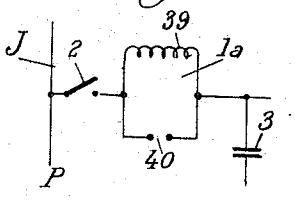
FIG. 8 shows a modification of a portion of FIG. 1, to wit the connection of the power line with a set of bus bars of the station.

Besides, it is possible to reduce the value of threshold S to some hundreds of volts for instance, by replacing the anti-resonant or stopper circuit 1 of conventional type of FIG. 1 by the untuned stopper circuit 1*a* of FIG. 8. This circuit comprises, in shunt, a coil 39 of high inductance (from 1 to 4 millihenrys for instance) and a spark gap 40 adjusted to a high voltage (averaging for instance 20 kv.) so that it does not come into play for disturbances produced by the operation of the circuit breakers or switches. On the contrary, the spark gap permits of eliminating overvoltages due to line faults.

Reverting to the circuit of FIG. 1, it is seen that the rectangular pulses, such as *d*, issuing from system G are counted in a primary memory 20 constituted for instance by a flip-flop binary counter. However duration limiter 19 reduces by a constant value the duration of the pulses *d* so as to permit counting only the pulses corresponding to useful signal (eliminating the short pulses corresponding to disturbances which have reached detector 13).

The different types of disturbances and faults are eliminated as follows in a system according to the present invention, as illustrated by FIG. 1.

Accidental weakenings of the signal produced by line faults are remedied by making use of a high power of transmission. It is also possible to remedy thereto through means as hereinafter indicated when describing the operation of the transmission system according to FIG. 9.

The high amplitude and short duration disturbances bring into play peak limiter 14, which limits their amplitude to S. The time constant of the input circuit of the system is reduced to CR, C being the capacity of capacitor 3 and R the resistance of resistor 15 (or 29). This constant is chosen to be low with respect to the period of the signals, that is to say to the period of the tuned circuit 3–6. For instance, for a frequency of the signals $f=40$ kc./s., and therefore for a period of the signals of 25 microseconds, it is possible to chose $C=10^{-9}$ farads and $R=50$ ohms, that is to say $CR=0.050$ microsecond. For CR very small with respect to the period of the signals, these disturbances cannot create oscillations by shock excitation in circuit 3–6. Such a disturbance produces at the input of coil 6 merely a short amplitude pulse S which is nearly instantaneously damped. On the contrary, a shock excited oscillation may be created by such a short pulse in anti-resonant circuit 7. This oscillation, although of small amplitude and very quickly damped due to the low time constant of the system, can however pass through the cells of filter 21, 22 and give rise, at the output of detector 13, to a unidirectional voltage of a duration $t_4$ much smaller than the duration $t_5$ of a useful signal (FIG. 7). The maximum value of $t_4$ may be either calculated or determined experimentally by applying to end E (or rather to the input of capacitor 3) a pulse of very high amplitude (averaging 1 megavolt for instance) which corresponds to the greatest disturbances that may take place during operation. If a short disturbance producing oscillations by shock excitation in circuit 7, and therefore a pulse of duration $t_4$, occurs during the transmission of a useful signal, the latter will be slightly modified, as to its shape, during a time $t_4$, but its counting will not be disturbed. If, on the contrary, a short disturbance took place between two useful signals, a pulse of a duration equal to $t_4$ would reach the primary memory device 20 which would count it in the absence of the duration limiter 19 which shortens all the pulses by a fixed duration greater than the maximum value of $t_4$ (determined as above indicated). For instance, for a frequency $f=40$ kc./s. and a duration of the signal pulses of 0.5 ms. (20 oscillations per binary pulse), the duration limiter may be constituted by a delay system (comprising in a known manner a capacitor which is charged by the pulses to be shortened and which controls, when it is charged, the base of a switching transistor, the delay being equal to the duration of the charge) introducing a delay of 0.200 ms. for instance, which suffices to eliminate disturbances. A diode enables this delay circuit to act only in one direction.

Figure 10:
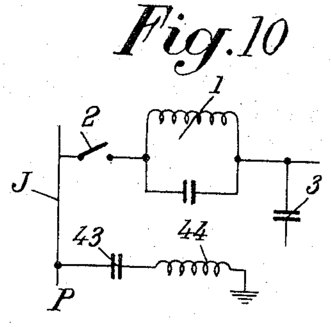
FIG. 10 shows means for reducing crosstalk between power lines connected in a high voltage station with the same set of bus bars.

As for the oscillating disturbances of mean amplitude and of relatively long duration (sometimes repeated and of a "biconical shape") they are first limited in amplitude, as the other disturbances, to level S by the peak limiter. If the frequency of such an oscillating disturbance is different from frequency *f*, it is considerably weakened in filters 21 and 22 and its level drops below the threshold T of the base limiter if no useful signal occurs at this time. After a time $t_1$, the amplitude of the disturbance drops below S and it is therefore damped by the filters and the low level limiter. If, on the contrary, such a disturbance occurs at the same time as a signal, its elimination is produced by the arrangement of base limiter 16, elongator 17 and amplifier 18, as above explained with reference to FIG. 7. What precedes applies to oscillating disturbances having frequencies sharply different from *f*, which are considerably weakened in filters 21, 22. On the contrary, oscillating disturbances of frequency *f* may produce at the output of detector 13 pulses of the same type as the pulses corresponding to useful signals and make the counting in memory or counter 20 inaccurate, thus rendering also inaccurate the information collected by the decoding device of the system which will be hereinafter described with reference to FIG. 9. In view of the fact that the frequencies of the oscillating disturbances are always higher than 100 kc./s., three solutions are possible:

(1) To choose *f* lower than 100 kc./s., for instance ranging from 10 to 50 kc./s. (in particular $f=40$ kc./s. in the example that is chosen) and in this case the oscillating disturbances, which have a frequency different from *f*, are damped by filters 21, 22 to a level which permits their correct elimination by the system including the low level limiter, the elongator and the saturated amplifier;

(2) To choose *f* higher than 100 kc./s, for instance of a value ranging from 400 to 600 kc./s. (in order to increase the rapidity of transmission of the signals, which permits of causing the protection means to act within a shorter time). But it is necessary in this case to double the equipment by choosing two different frequencies for the signals in each equipment so that the oscillating disturbances cannot simultaneously disturb both of the equipments (they can disturb only the equipment adjusted to their frequency);

(3) To short-circuit, as indicated on FIG. 10, the set of bus bars at the frequency *f* of transmission which prevents the action of the oscillating disturbances of frequencies close to *f* (it is reminded that the high frequencies disturbances were attenuated by resonant circuit 3, 6 and directed to the ground by anti-resonant circuit 7).

In the most unfavorable case (repeated oscillating disturbances), the shock-excited oscillations are damped one after the other, each of them being damped before the next one begins.

It will be noted that the elimination of disturbances is improved when there is provided, instead of a single peak limiter 14, several such limiters having suitable intervals of operation.

Finally the elimination or filtering of crosstalk due to HF telephonic radio broadcasting installations does not involve any difficulty because the level T of the base limiter is chosen relatively high (for instance averaging 0.6 volt, whereas the level for telephone or broadcasting systems averages 1 millivolt). As for crosstalk between several lines L connected with the same set of bus bars J, it will be hereinafter examined, after setting forth the second feature of the invention, relative to the utilization of a single transmitter and of a single system for utilizing reception by means of a high voltage station, which will now be described with reference to FIG. 9.

On this figure, I have diagrammatically illustrated a line $L_{12}$ connecting the set of bus bars $J_1$ of station $P_1$ to the set of bars $J_2$ of station $P_2$. To every set of bars several lines are connected. For instance, from the set of bus bars $J_1$ of station $P_1$ start in addition to the line $L_{12}$ which leads to station $P_2$, line $L_{13}$ which leads to station $P_3$ and line $L_{14}$ which leads to station $P_4$. In a likewise manner, to the set of bus bars $J_2$ are connected lines $L_{12}$, $L_{25}$ and $L_{26}$ leading to stations $P_1$, $P_5$ and $P_6$ respectively. Although I have shown only one set of bus bars $J_1$, $J_2$ for every station $P_1$, $P_2$, as a rule every station comprises several sets of bars and to every set of bus bars may be connected one or several lines.

The connections are made, as in the case of FIG. 1, through a anti-resonant circuit 1 (or a circuit 1a of the type illustrated by FIG. 8) and a switch 2. To the end $E_1$, $E_2$ . . . of every line there is shunt coupled, by means of capacitor 3, an arrangement of the type illustrated by FIG. 1 and comprising a system $F_1$, $F_2$, $F_3$, $F_4$, $F_5$, $F_6$ (identical to the system F of FIG. 1), a switching system 11 connecting with $F_1$, $F_2$, $F_3$, $F_4$, $F_5$, $F_6$ either the corresponding amplifier 12 or the corresponding system $G_1$, $G_2$, $G_3$, $G_4$, $G_5$, $G_6$ (identical to the system G of FIG. 1).

According to the third feature of the present invention, there is provided, for the whole of every station, such as $P_1$, $P_2$, on the one hand, for transmission, a single signal transmitter or oscillator, $H_1$, $H_2$ respectively, working on a single high frequency *f* and corresponding with a single coding device $K_1$, $K_2$ respectively—which codes the oscillations of frequency *f* by cutting into trains of pulses (of oscillations) of well determined length (or possibly by frequency shift) in accordance with the instructions or information (for protection control or intelligence transmission) to be transmitted supplied by relays 41a, 41b, 41c or 41d, 41e, 41f (controlled either by push buttons or automatically)—and selecting means, $M_1$, $M_2$ respectively, for switching the coded high frequency toward the transmitting amplifier 12 and therefore toward the line ($L_{12}$, $L_{13}$ or $L_{14}$, $L_{12}$, $L_{25}$ or $L_{26}$ respectively) through which the transmission is to be effected; and on the other hand, for reception, a single decoder and selector system, comprising a decoder $N_1$, $N_2$ respectively, which decodes the countings of the primary memories 20 of every line of station $P_1$, $P_2$ and a selector $Q_1$, $Q_2$ respectively which, according to the signal that is received and decoded, controls one or the other of the actuating relays 42a, 42b, 42c respectively 42d, 42e, 42f which are connected thereto.

The structure of high frequency oscillators, coding devices, decoding devices and selectors is well known in the art and it has been deemed unnecessary to describe it in detail. It will be merely noted that use is preferably made of a coding system making use of binary pulses which are counted in memories 20 constituted by one or several flip-flops. In the case of a single flip-flop for every memory 20, decoding devices $N_1$, $N_2$ may receive, from a unit, not shown, counter pulses of fixed period which are opposed to the pulses opertaing the flip-flop of the memory device that is being operated and the selector receives counter pulses only in the absence of a signal pulse. But of course any other decoding and selector system may be used. The number of relays 41 on the one hand and 42 on the other hand at every station depends upon the number of different orders to be transmitted and to be received and it does not limit in any way the scope of the invention.

The operation of the transmission system of FIG. 9 is as follows, it being supposed that a protection control or intelligence transmission signal order is to be transmitted from station $P_1$ to station $P_2$, this order Z being controlled by the relay 41a of $P_1$ and being intended to operate the relay 42d of $P_2$.

The closing of relay 41a operates selector $M_1$ and the coding device $K_1$ of $P_1$ to send from oscillator $H_1$ a train of pulses representing the coded order Z toward the amplifier 12 connected to line $L_{12}$. This train of pulses reaches (through switching element 11, system $F_1$ and capacitor 3) the end $E_1$ of line $L_{12}$. This line permits transmission from station $P_1$ to station $P_2$, which may be at a distance of about 60 miles for instance.

At station $P_2$, the train of pulses, slightly weakened, passes through capacitor 3, at the end $E_2$ of line $L_{12}$, then through system $F_2$ and switching element 11 which directs it toward receiver system $G_2$ and the pulses of the train, freed from possible disturbances produced by transmission through line $L_{12}$, are sent to the primary memory 20 associated with $G_2$. Decoding device $N_2$ and selector $Q_2$ determine, in accordance with the signals that are received, the relay 42d which is to be closed (or opened) in response to order Z.

In order to ensure a perfect safety of the good transmission of order Z, selector $Q_2$ may, in response to the reception of order Z, close (by a not shown control line) a relay 41d corresponding to this order. The closing of 41d coresponds to an order $Z_r$ for return checking corresponding to Z and provides a series of operations analogous to those stated for order Z (but from station $P_2$ toward station $P_1$) thereby the order $Z_r$ is conveyed from the relay 41d of station $P_2$ to a relay 41 (not shown) of station $P_1$, which relay 41 stops the transmission of order Z. As long as the return order $Z_r$ has not been returned to station $P_1$, the transmission of order Z from station $P_1$ toward station $P_2$ goes on.

It should be noted that the transmission of a signal from a station $P_1$ to a station $P_2$ does not necessarily take place through the line $L_{12}$ connecting these two stations. If the signal is transmitted e.g. by error from station $P_1$ to station $P_3$ for instance, the decoding device N of station $P_3$ immediately realizes that this order is not intended for its station and it retransmits it to its destination, to wit station $P_2$. This permits of using emergency lines either systematically or in case of a serious fault on the normal line.

It will therefore be seen that the system according to the present invention, in particular as illustrated by FIGS. 1 and 9, is capable of transmitting protection, control and/or intelligence transmission signals which are stored in a memory as they arrive to the receiver means of the equipment. This permits of giving an absolute priority to the protection signals, the control and intelligence transmitting signals being kept in memory for the time necessary to perform the protection operation.

The fact of using a single transmission frequency *f* (selectivity between the respective stations on the one hand and the respective controls at every station on the other hand being ensured by the coding of pulses consisting of oscillations at frequency *f*) has the following advantages:

Standard units (anti-resonant circuits, filter cells, peak limiters, base limiters and so on) may be used at the different stations which is obviously advantageous from the point of view of economy;

The equipment requires only very few modifications when changing the arrangement of the power lines at a station, since it suffices to effect a mere coding modification.

But the use of a single frequency in the different power lines risks of introducing crosstalk between the lines connected to the same station. As a matter of fact, it is not possible to rely entirely upon the anti-resonant circuits 1 to ensure a complete separation of the lines from the point of view of transmission of the frequency $f$, because these anti-resonant circuits generally include lightning protectors (not shown) which, in case of a fault on the line, destroy the frequency adjustment of the anti-resonant circuit of this line. Due to the relatively imperfect rejection of the frequency $f$ by anti-resonant circuits 1, there may exist between the different lines connected to the same high voltage station, for instance between lines $L_{12}$, $L_{13}$ and $L_{14}$ of station $P_1$, some crosstalk from one line to the other. The normal means for remedying this is to use a suitable coding so that, if a signal is transmitted through a set of bus bars such as $J_1$ from one line to another one, the equipment receiving by mistake a signal which is not intended for it does not consider it as a signal intended for itself.

Another means for avoiding this diaphony consists in connecting, as illustrated by FIG. 10, every set of bars J of a high voltage station according to the invention with the ground through a capacitor 43 and a coil 44 in series, circuit 43–44 being such that, for the frequency $f$ of the signals, the set of bus bars J is short-circuited toward the ground. It is also possible to short-circuit for the transmission frequency $f$ the low voltage winding of the transformers of every station by means of a circuit tuned to this frequency $f$.

When using the arrangement of FIG. 10, the transmission lines connected to the same station are then separated from one another for frequency $f$ by the anti-crosstalk filtering system between the lines of a same set of bus bars, this filtering system consisting of anti-resonant circuits 1 and circuits 43–44, the latter eliminating the residues at frequency $f$ which may have passed through anti-resonant circuits 1.

This permits of simplifying coding, which is particularly important for teleprotection because there is no longer any risk of accidental transmission through lines which should not be brought into play. Simplification of coding permits as a matter of fact of reducing the number of pulses for every signal to be transmitted, therefore of reducing the duration of the transmission of every order, in particular of every protection order. It is thus possible to reduce the duration of a transmission for instance to a value averaging one millisecond.

Another means for reducing the duration of a transmission by reducing the interval of rest between two signal pulses consists in using, instead of a single base limiter 16, several low level limiters in shunt, consisting for instance each of a Zener diode and respectively adjusted at 60, 50, 40, 30 and 20 decibels below the level of transmission of the signals. In the normal state of rest only the 60 decibels base limiter is connected. When a high level signal occurs, the 50, 40, 30 and 20 decibels base limiters are gradually energized, the energizing of the 40 decibels base limiter switching on the 50 decibels low level limiter instead of the 60 decibels base limiter by means of a relay of the ultra-quick type for the setting into operation but slower for its return to the state of rest. In a likewise manner the 30 decibels base limiter switches on the 40 decibels base limiter instead of the 50 decibels base limiter in the same conditions. Such an operation has for its effect to shorten the periods non-utilizable just before and just after every useful signal and thus to reduce the interval of rest necessary between two pulses.

The system according to the present invention has, in particular, the following advantages.

First, it ensures a transmission as perfect as possible of the useful signals, even when the system is acted upon by disturbances coming from power lines or high voltage stations connected through these lines.

The transmission is also ensured in excellent conditions even when the transmission coefficient of the line accidentally becomes very low due to icing, connection with the ground, and so on.

The system according to the present invention permits of using a standard units for the stations, which can be manufactured in great quantities.

The adaptation of the system of connection existing in the different high voltage stations is easy.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A system for transmitting high frequency signals by means of carrier currents on a plurality of power lines with two ends, including a unit connected in shunt at least at some ends of said power lines, whereas each end of said power lines is connected to a bus bar through an anti-resonant circuit rejecting the high frequency signals and circuit breaking means in series therewith, each unit comprising, in combination, starting from the associated power line end: a coupling capacitor and an inductor forming a series-resonant circuit tuned to the high frequency of the signals, the armature of said capacitor not connected to said inductor being connected to said power line end; a drainage coil connected in shunt relatively to said inductor; peak limiting means also connected in shunt relatively to said inductor; impedance matching and connecting means having a first extremity thereof connected to the end of said inductor not connected to said capacitor in said series-resonant circuit; switching means having a first, second and third terminal and adapted to be in one of two possible states, i.e. a first state wherein the first terminal is connected to said second terminal and a second state wherein said first terminal is connected to said third terminal, said switching means having a first terminal thereof connected to the second extremity of said impedance matching and connecting means; filter means having their input connected to said second terminal of said switching means for receiving the output of said impedance matching and transmission means, from the second extremity thereof, when said switching means are in their first state; detecting means connected to the output of said filter means; base limiting means connected to the output of said detecting means; pulse elongating means connected to the output of said base limiting means; memory means connected to the output of said pulse elongating means; duration limiting means connected to said memory means for reducing the duration of the pulses received by said memory means; and decoding means connected to said memory means for decoding the successive pulses stored therein; and coding means connected to said third terminal of said switching means.

2. A system according to claim 1 which comprises, to transmit said signals, means for producing an unmodulated high frequency high power current and means for coding said current by frequency modulation.

3. A system for transmitting pulse coded high frequency signals by means of carrier currents on a plurality of power lines with two ends, including a unit connected in shunt at least at some ends of said power lines, whereas each end of said power lines is connected to a bus bar through an anti-resonant circuit rejecting the high frequency signals and circuit breaking means in series therewith, each unit comprising, in combination, starting from the associated power line end: a coupling capacitor and an inductor forming a series-resonant circuit tuned to the high frequency of the signals, the armature of said capacitor not connected to said inductor being connected to said power line end; a drainage coil connected in shunt relatively to said inductor; peak limiting means also connected in shunt relatively to said inductor; impedance matching and connecting means having a first extremity thereof connected to the end of said inductor not connected to said capacitor in said series-resonant circuit; switching means having a first, second and third terminal and adapted to be in one of two possible states, i.e. a first state wherein the first terminal is connected to said second terminal and a second state wherein said first terminal is connected to said third terminal, said switching means having a first terminal thereof connected to the second extremity of said impedance matching and connecting means; filter means having their input connected to said second terminal of said switching means for receiving the output of said impedance matching and transmission means, from the second extremity thereof, when said switching means are in their first state; detecting means connected to the output of said filter means; base limiting means connected to the output of said detecting means; pulse elongating means connected to the output of said base limiting means; memory means connected to the output of said pulse elongating means; duration limiting means connected to said memory means for reducing the duration of the pulses received by said memory means; and pulse decoding means connected to said memory means for decoding the successive pulses stored therein and pulse coding means connected to said third terminal of said switching means.

4. A system according to claim 3 which comprises, to transmit said signals, means for producing an unmodulated high frequency high power current and means for coding said current in the form of binary pulses.

5. A system according to claim 3, wherein the bus bars are located in high voltage stations and which comprises, at every high voltage station to which several of said power lines are connected, on the one hand, for transmission, a single signal transmitter working on a single high frequency and cooperating with a single of said coding means, and means for directing the coded high frequency toward the line through which the transmission is to be performed and, on the other hand, for reception, a single decoder-selector system for decoding the coded signals received by the different lines of the station and for selecting the various relays to be controlled.

References Cited

UNITED STATES PATENTS

| | | | |
|---|---|---|---|
| 2,654,805 | 10/1953 | Derr | 179—2.5 |
| 2,795,649 | 6/1957 | Carter | 179—2.5 |

FOREIGN PATENTS

| | | |
|---|---|---|
| 1,076,752 | 3/1960 | Germany. |

JOHN W. CALDWELL, *Acting Primary Examiner.*

J. T. STRATMAN, *Assistant Examiner.*